United States Patent
Kale

(10) Patent No.: US 11,960,025 B2
(45) Date of Patent: Apr. 16, 2024

(54) INTELLIGENT RADAR HAVING DEEP LEARNING ACCELERATOR AND RANDOM ACCESS MEMORY

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 197 days.

(21) Appl. No.: 17/077,985

(22) Filed: Oct. 22, 2020

(65) Prior Publication Data

US 2022/0128657 A1   Apr. 28, 2022

(51) Int. Cl.
*G01S 7/41*   (2006.01)
*G01S 13/86*  (2006.01)
*G01S 13/89*  (2006.01)

(52) U.S. Cl.
CPC ............ *G01S 7/417* (2013.01); *G01S 13/867* (2013.01); *G01S 13/89* (2013.01)

(58) Field of Classification Search
CPC ......... G01S 7/417; G01S 13/867; G01S 13/89
See application file for complete search history.

(56) References Cited

U.S. PATENT DOCUMENTS

| | | | |
|---|---|---|---|
| 2017/0220876 A1 | 8/2017 | Gao et al. | |
| 2018/0260688 A1* | 9/2018 | Kaufhold | G01S 7/417 |
| 2019/0370644 A1* | 12/2019 | Kenney | G06N 3/0675 |
| 2020/0025877 A1 | 1/2020 | Sarkis et al. | |
| 2020/0026720 A1* | 1/2020 | Liu | G05D 1/101 |
| 2020/0192375 A1* | 6/2020 | Riggs | G08G 1/096791 |
| 2021/0125036 A1* | 4/2021 | Tremblay | G06V 10/242 |
| 2021/0406674 A1* | 12/2021 | Wu | G06N 3/04 |

OTHER PUBLICATIONS

International Search Report and Written Opinion, PCT/US2021/054683, dated Feb. 8, 2022.

* cited by examiner

*Primary Examiner* — Peter M Bythrow
*Assistant Examiner* — Nazra Nur Waheed
(74) *Attorney, Agent, or Firm* — Greenberg Traurig

(57) ABSTRACT

Systems, devices, and methods related to a radar and an artificial neural network are described. For example, the radar can have at least one processing unit configured to execute instructions implementing matrix computation of the artificial neural network. The artificial neural network is configured to identify features in the radar image in an output responsive to an input containing a radar image. Optionally, the radar can further include an image sensor to generate an optical image as part of the input to artificial neural network. Instead of outputting the radar images and/or the optical images, the radar may output a description of the features identified via the artificial neural network from the radar image.

14 Claims, 11 Drawing Sheets

INTELLIGENT RADAR HAVING DEEP LEARNING ACCELERATOR AND RANDOM ACCESS MEMORY

TECHNICAL FIELD

At least some embodiments disclosed herein relate to radar in general and more particularly, but not limited to, radar enhanced with Artificial Neural Networks (ANNs).

BACKGROUND

An Artificial Neural Network (ANN) uses a network of neurons to process inputs to the network and to generate outputs from the network.

Deep learning has been applied to many application fields, such as computer vision, speech/audio recognition, natural language processing, machine translation, bioinformatics, drug design, medical image processing, games, etc.

A radar transmits electromagnetic waves in the frequency range of radio or microwaves. Radio waves may be pulsed or continuous and can reflect off objects to provide information about the objects, such as location and speed.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
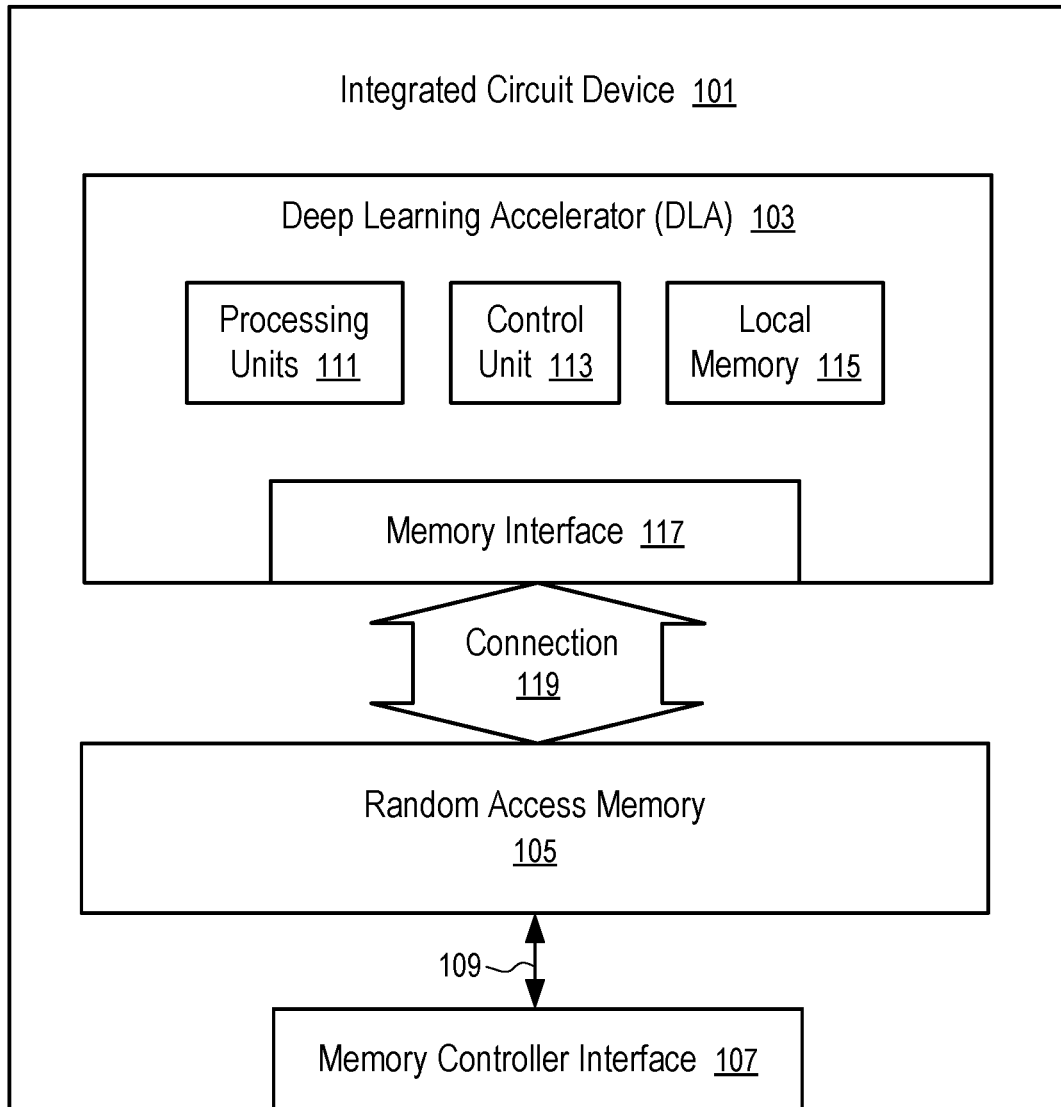
FIG. 1 shows an integrated circuit device having a Deep Learning Accelerator and random access memory configured according to one embodiment.

At least some embodiments disclosed herein provide an intelligent radar that uses an Artificial Neural Network (ANN) to generate a compact output that describes the features, such as objects, items, events, that are recognized from the radar images.

A radar can generate a large amount of data. Storing and/or uploading the radar data to a server, or a central processing unit (CPU), for processing and/or for storage can involve the use of a high communication bandwidth and/or a large data storage capacity.

To reduce the requirements on data traffic, data storage, and/or to reduce the computation workload of the server or the central processing unit (CPU), an integrated circuit device having a combination of Random Access Memory (RAM) and a Deep Learning Accelerator (DLA) can be configured in the radar to consume and/or filter out most of the data generated by the radar.

For example, an Artificial Neural Network (ANN) implemented via the integrated circuit device can recognize routine situations, items, events, features, objects, etc. that are relevant to a particular application of the radar. Thus, the radar data can be converted into a high level input stream that requires a smaller amount of data storage capacity, data transmission bandwidth, and/or computing power for processing.

Optionally, data of non-recognized, unusual situations, items, events, features, objects, etc., can be extracted and transmitted to the server or the central processing unit (CPU), for further processing. The processing results can be used to further train the Artificial Neural Network (ANN). The further trained Artificial Neural Network (ANN) can be loaded back into the integrated circuit device to further reduce data to be transmitted, stored, processed outside of the intelligent radar.

Further, radar data can be enhanced with optical data from one or more digital cameras. For example, the same scene as scanned by the radar using the electromagnetic waves in the frequency range of radio or microwaves can be captured as optical images from a digital camera. The digital camera, or an image sensor, can perform imaging via sensing lights visible to human eyes and/or infrared lights. The optical images captured by the digital camera can provide addition information about the situations, items, events, features, objects, etc. to be recognized from the radar image of the scene. For example, the fusion of the sensor data from the radar and the digital camera can be analyzed together in the Artificial Neural Network (ANN) to identify features of interest in a particular application of the radar, such as obstacle detection, pathfinding, tracking targets for the control of an autonomous vehicle or drone.

An integrated circuit can be configured to perform computations of Artificial Neural Networks (ANNs) with reduced energy consumption and computation time. The integrated circuit can include a Deep Learning Accelerator (DLA) and Random Access Memory (RAM). The Deep Learning Accelerator (DLA) includes a set of programmable hardware computing logic that is specialized and/or optimized to perform parallel vector and/or matrix calculations, including but not limited to multiplication and accumulation of vectors and/or matrices.

Further, the Deep Learning Accelerator (DLA) can include one or more Arithmetic-Logic Units (ALUs) to perform arithmetic and bitwise operations on integer binary numbers.

The Deep Learning Accelerator (DLA) is programmable via a set of instructions to perform the computations of an Artificial Neural Network (ANN).

The granularity of the Deep Learning Accelerator (DLA) operating on vectors and matrices corresponds to the largest unit of vectors/matrices that can be operated upon during the execution of one instruction by the Deep Learning Accelerator (DLA). During the execution of the instruction for a predefined operation on vector/matrix operands, elements of vector/matrix operands can be operated upon by the Deep Learning Accelerator (DLA) in parallel to reduce execution time and/or energy consumption associated with memory/data access. The operations on vector/matrix operands of the granularity of the Deep Learning Accelerator (DLA) can be used as building blocks to implement computations on vectors/matrices of larger sizes.

The implementation of a typical/practical Artificial Neural Network (ANN) involves vector/matrix operands having sizes that are larger than the operation granularity of the Deep Learning Accelerator (DLA). To implement such an Artificial Neural Network (ANN) using the Deep Learning Accelerator (DLA), computations involving the vector/matrix operands of large sizes can be broken down to the computations of vector/matrix operands of the granularity of the Deep Learning Accelerator (DLA). The Deep Learning Accelerator (DLA) can be programmed via instructions to carry out the computations involving large vector/matrix operands. For example, atomic computation capabilities of the Deep Learning Accelerator (DLA) in manipulating vectors and matrices of the granularity of the Deep Learning Accelerator (DLA) in response to instructions can be programmed to implement computations in an Artificial Neural Network (ANN).

In some implementations, the Deep Learning Accelerator (DLA) lacks some of the logic operation capabilities of a typical Central Processing Unit (CPU). However, the Deep Learning Accelerator (DLA) can be configured with sufficient logic units to process the input data provided to an Artificial Neural Network (ANN) and generate the output of the Artificial Neural Network (ANN) according to a set of instructions generated for the Deep Learning Accelerator (DLA). Thus, the Deep Learning Accelerator (DLA) can perform the computation of an Artificial Neural Network (ANN) with little or no help from a Central Processing Unit (CPU) or another processor. Optionally, a conventional general purpose processor can also be configured as part of the Deep Learning Accelerator (DLA) to perform operations that cannot be implemented efficiently using the vector/matrix processing units of the Deep Learning Accelerator (DLA), and/or that cannot be performed by the vector/matrix processing units of the Deep Learning Accelerator (DLA).

A typical Artificial Neural Network (ANN) can be described/specified in a standard format (e.g., Open Neural Network Exchange (ONNX)). A compiler can be used to convert the description of the Artificial Neural Network (ANN) into a set of instructions for the Deep Learning Accelerator (DLA) to perform calculations of the Artificial Neural Network (ANN). The compiler can optimize the set of instructions to improve the performance of the Deep Learning Accelerator (DLA) in implementing the Artificial Neural Network (ANN).

For example, each neuron in an Artificial Neural Network (ANN) receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Based on a given ANN model, a computing device can be configured to compute the output(s) of the network from a given set of inputs to the network.

For example, the inputs to an ANN network may be generated based on camera inputs; and the outputs from the ANN network may be the identification of an item, such as an event or an object.

In general, an ANN may be trained using a supervised method where the parameters in the ANN are adjusted to minimize or reduce the error between known outputs associated with or resulted from respective inputs and computed outputs generated via applying the inputs to the ANN. Examples of supervised learning/training methods include reinforcement learning and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

Deep learning uses multiple layers of machine learning to progressively extract features from input data. For example, lower layers can be configured to identify edges in an image; and higher layers can be configured to identify, based on the edges detected using the lower layers, items captured in the image, such as faces, objects, events, etc. Deep learning can be implemented via Artificial Neural Networks (ANNs), such as deep neural networks, deep belief networks, recurrent neural networks, and/or convolutional neural networks.

The Deep Learning Accelerator (DLA) can have local memory, such as registers, buffers and/or caches, configured to store vector/matrix operands and the results of vector/matrix operations. Intermediate results in the registers can be pipelined/shifted in the Deep Learning Accelerator (DLA) as operands for subsequent vector/matrix operations to reduce time and energy consumption in accessing memory/data and thus speed up typical patterns of vector/matrix operations in implementing a typical Artificial Neural Network (ANN). The capacity of registers, buffers and/or caches in the Deep Learning Accelerator (DLA) is typically insufficient to hold the entire data set for implementing the computation of a typical Artificial Neural Network (ANN). Thus, a random access memory coupled to the Deep Learning Accelerator (DLA) is configured to provide an improved data storage capability for implementing a typical Artificial Neural Network (ANN). For example, the Deep Learning Accelerator (DLA) loads data and instructions from the random access memory and stores results back into the random access memory.

The communication bandwidth between the Deep Learning Accelerator (DLA) and the random access memory is configured to optimize or maximize the utilization of the computation power of the Deep Learning Accelerator (DLA). For example, high communication bandwidth can be provided between the Deep Learning Accelerator (DLA) and the random access memory such that vector/matrix operands can be loaded from the random access memory into the Deep Learning Accelerator (DLA) and results stored back into the random access memory in a time period that is approximately equal to the time for the Deep Learning Accelerator (DLA) to perform the computations on the vector/matrix operands. The granularity of the Deep Learning Accelerator (DLA) can be configured to increase the ratio between the amount of computations performed by the Deep Learning Accelerator (DLA) and the size of the vector/matrix operands such that the data access traffic between the Deep Learning Accelerator (DLA) and the random access memory can be reduced, which can reduce the requirement on the communication bandwidth between the Deep Learning Accelerator (DLA) and the random access memory. Thus, the bottleneck in data/memory access can be reduced or eliminated.

FIG. 1 shows an integrated circuit device (101) having a Deep Learning Accelerator (103) and random access memory (105) configured according to one embodiment.

The Deep Learning Accelerator (103) in FIG. 1 includes processing units (111), a control unit (113), and local memory (115). When vector and matrix operands are in the local memory (115), the control unit (113) can use the processing units (111) to perform vector and matrix operations in accordance with instructions. Further, the control unit (113) can load instructions and operands from the random access memory (105) through a memory interface (117) and a high speed/bandwidth connection (119).

The integrated circuit device (101) is configured to be enclosed within an integrated circuit package with pins or contacts for a memory controller interface (107).

The memory controller interface (107) is configured to support a standard memory access protocol such that the integrated circuit device (101) appears to a typical memory controller in a way same as a conventional random access memory device having no Deep Learning Accelerator (DLA) (103). For example, a memory controller external to the integrated circuit device (101) can access, using a standard memory access protocol through the memory controller interface (107), the random access memory (105) in the integrated circuit device (101).

The integrated circuit device (101) is configured with a high bandwidth connection (119) between the random access memory (105) and the Deep Learning Accelerator (DLA) (103) that are enclosed within the integrated circuit device (101). The bandwidth of the connection (119) is higher than the bandwidth of the connection (109) between the random access memory (105) and the memory controller interface (107).

In one embodiment, both the memory controller interface (107) and the memory interface (117) are configured to access the random access memory (105) via a same set of buses or wires. Thus, the bandwidth to access the random access memory (105) is shared between the memory interface (117) and the memory controller interface (107). Alternatively, the memory controller interface (107) and the memory interface (117) are configured to access the random access memory (105) via separate sets of buses or wires. Optionally, the random access memory (105) can include multiple sections that can be accessed concurrently via the connection (119). For example, when the memory interface (117) is accessing a section of the random access memory (105), the memory control interface (107) can concurrently access another section of the random access memory (105). For example, the different sections can be configured on different integrated circuit dies and/or different planes/banks of memory cells; and the different sections can be accessed in parallel to increase throughput in accessing the random access memory (105). For example, the memory controller interface (107) is configured to access one data unit of a predetermined size at a time; and the memory interface (117) is configured to access multiple data units, each of the same predetermined size, at a time.

In one embodiment, the random access memory (105) and the integrated circuit device (101) are configured on different integrated circuit dies configured within a same integrated circuit package. Further, the random access memory (105) can be configured on one or more integrated circuit dies that allows parallel access of multiple data elements concurrently.

In some implementations, the number of data elements of a vector or matrix that can be accessed in parallel over the connection (119) corresponds to the granularity of the Deep Learning Accelerator (DLA) operating on vectors or matrices. For example, when the processing units (111) can operate on a number of vector/matrix elements in parallel, the connection (119) is configured to load or store the same number, or multiples of the number, of elements via the connection (119) in parallel.

Optionally, the data access speed of the connection (119) can be configured based on the processing speed of the Deep Learning Accelerator (DLA) (103). For example, after an amount of data and instructions have been loaded into the local memory (115), the control unit (113) can execute an instruction to operate on the data using the processing units (111) to generate output. Within the time period of processing to generate the output, the access bandwidth of the connection (119) allows the same amount of data and instructions to be loaded into the local memory (115) for the next operation and the same amount of output to be stored back to the random access memory (105). For example, while the control unit (113) is using a portion of the local memory (115) to process data and generate output, the memory interface (117) can offload the output of a prior operation into the random access memory (105) from, and load operand data and instructions into, another portion of the local memory (115). Thus, the utilization and performance of the Deep Learning Accelerator (DLA) are not restricted or reduced by the bandwidth of the connection (119).

The random access memory (105) can be used to store the model data of an Artificial Neural Network (ANN) and to buffer input data for the Artificial Neural Network (ANN). The model data does not change frequently. The model data can include the output generated by a compiler for the Deep Learning Accelerator (DLA) to implement the Artificial Neural Network (ANN). The model data typically includes matrices used in the description of the Artificial Neural Network (ANN) and instructions generated for the Deep Learning Accelerator (DLA) (103) to perform vector/matrix operations of the Artificial Neural Network (ANN) based on vector/matrix operations of the granularity of the Deep Learning Accelerator (DLA) (103). The instructions operate not only on the vector/matrix operations of the Artificial Neural Network (ANN), but also on the input data for the Artificial Neural Network (ANN).

In one embodiment, when the input data is loaded or updated in the random access memory (105), the control unit (113) of the Deep Learning Accelerator (DLA) (103) can automatically execute the instructions for the Artificial Neural Network (ANN) to generate an output of the Artificial Neural Network (ANN). The output is stored into a predefined region in the random access memory (105). The Deep Learning Accelerator (DLA) (103) can execute the instructions without help from a Central Processing Unit (CPU). Thus, communications for the coordination between the Deep Learning Accelerator (DLA) (103) and a processor outside of the integrated circuit device (101) (e.g., a Central Processing Unit (CPU)) can be reduced or eliminated.

Optionally, the logic circuit of the Deep Learning Accelerator (DLA) (103) can be implemented via Complementary Metal Oxide Semiconductor (CMOS). For example, the technique of CMOS Under the Array (CUA) of memory cells of the random access memory (105) can be used to implement the logic circuit of the Deep Learning Accelerator (DLA) (103), including the processing units (111) and the control unit (113). Alternatively, the technique of CMOS in the Array of memory cells of the random access memory (105) can be used to implement the logic circuit of the Deep Learning Accelerator (DLA) (103).

In some implementations, the Deep Learning Accelerator (DLA) (103) and the random access memory (105) can be implemented on separate integrated circuit dies and connected using Through-Silicon Vias (TSV) for increased data bandwidth between the Deep Learning Accelerator (DLA) (103) and the random access memory (105). For example, the Deep Learning Accelerator (DLA) (103) can be formed on an integrated circuit die of a Field-Programmable Gate Array (FPGA) or Application Specific Integrated circuit (ASIC).

Alternatively, the Deep Learning Accelerator (DLA) (103) and the random access memory (105) can be configured in separate integrated circuit packages and connected via multiple point-to-point connections on a printed circuit board (PCB) for parallel communications and thus increased data transfer bandwidth.

The random access memory (105) can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer that is located above the memory element columns, and wires of the other layer run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory (105). The non-volatile memory in the random access memory (105) can be used to store the model data of an Artificial Neural Network (ANN). Thus, after the integrated circuit device (101) is powered off and restarts, it is not necessary to reload the model data of the Artificial Neural Network (ANN) into the integrated circuit device (101). Further, the non-volatile memory can be programmable/ rewritable. Thus, the model data of the Artificial Neural Network (ANN) in the integrated circuit device (101) can be updated or replaced to implement an update Artificial Neural Network (ANN), or another Artificial Neural Network (ANN).

The processing units (111) of the Deep Learning Accelerator (DLA) (103) can include vector-vector units, matrix-vector units, and/or matrix-matrix units. Examples of units configured to perform for vector-vector operations, matrix-vector operations, and matrix-matrix operations are discussed below in connection with FIGS. 2-4.

Figure 2:
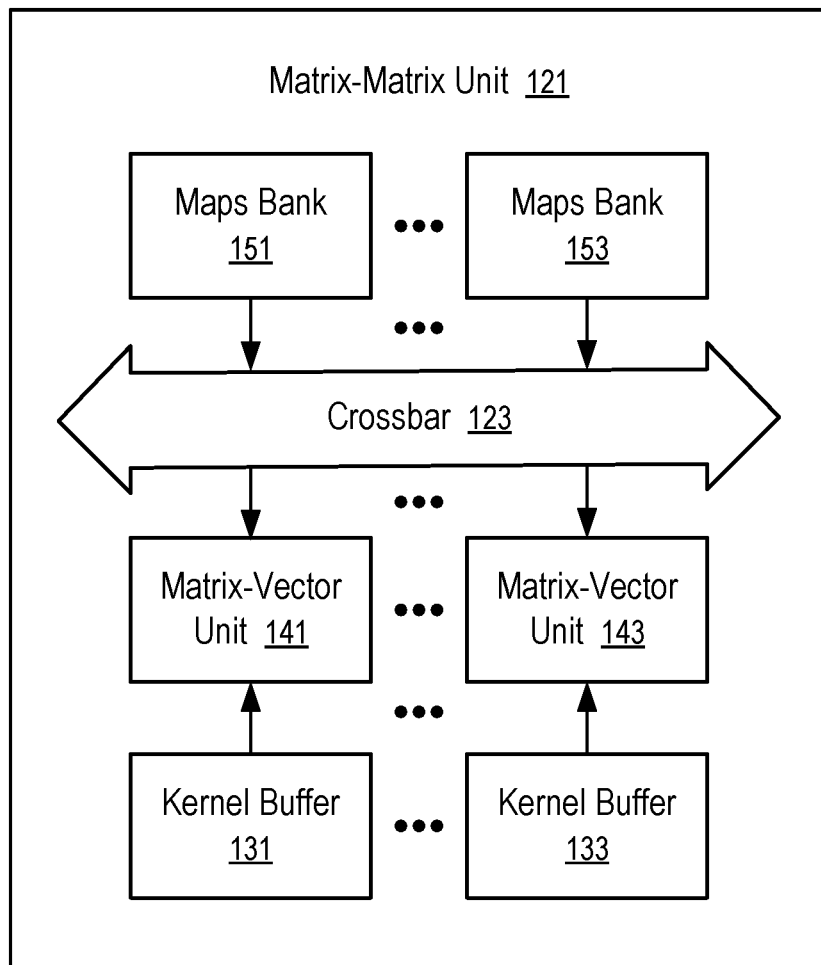
FIG. 2 shows a processing unit configured to perform matrix-matrix operations according to one embodiment.

FIG. 2 shows a processing unit configured to perform matrix-matrix operations according to one embodiment. For example, the matrix-matrix unit (121) of FIG. 2 can be used as one of the processing units (111) of the Deep Learning Accelerator (DLA) (103) of FIG. 1.

In FIG. 2, the matrix-matrix unit (121) includes multiple kernel buffers (131 to 133) and multiple the maps banks (151 to 153). Each of the maps banks (151 to 153) stores one vector of a matrix operand that has multiple vectors stored in the maps banks (151 to 153) respectively; and each of the kernel buffers (131 to 133) stores one vector of another matrix operand that has multiple vectors stored in the kernel buffers (131 to 133) respectively. The matrix-matrix unit (121) is configured to perform multiplication and accumulation operations on the elements of the two matrix operands, using multiple matrix-vector units (141 to 143) that operate in parallel.

A crossbar (123) connects the maps banks (151 to 153) to the matrix-vector units (141 to 143). The same matrix operand stored in the maps bank (151 to 153) is provided via the crossbar (123) to each of the matrix-vector units (141 to 143); and the matrix-vector units (141 to 143) receives data elements from the maps banks (151 to 153) in parallel. Each of the kernel buffers (131 to 133) is connected to a respective one in the matrix-vector units (141 to 143) and provides a vector operand to the respective matrix-vector unit. The matrix-vector units (141 to 143) operate concurrently to compute the operation of the same matrix operand, stored in the maps banks (151 to 153) multiplied by the corresponding vectors stored in the kernel buffers (131 to 133). For example, the matrix-vector unit (141) performs the multiplication operation on the matrix operand stored in the maps banks (151 to 153) and the vector operand stored in the kernel buffer (131), while the matrix-vector unit (143) is concurrently performing the multiplication operation on the matrix operand stored in the maps banks (151 to 153) and the vector operand stored in the kernel buffer (133).

Figure 3:
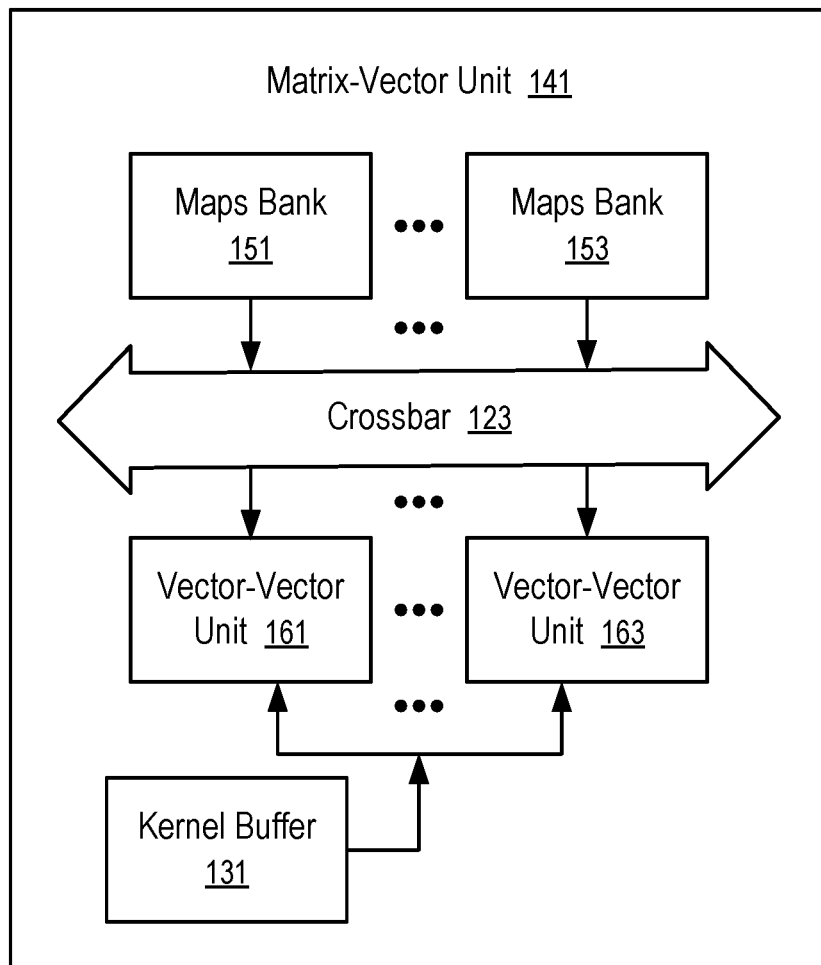
FIG. 3 shows a processing unit configured to perform matrix-vector operations according to one embodiment.

Each of the matrix-vector units (141 to 143) in FIG. 2 can be implemented in a way as illustrated in FIG. 3.

FIG. 3 shows a processing unit configured to perform matrix-vector operations according to one embodiment. For example, the matrix-vector unit (141) of FIG. 3 can be used as any of the matrix-vector units in the matrix-matrix unit (121) of FIG. 2.

In FIG. 3, each of the maps banks (151 to 153) stores one vector of a matrix operand that has multiple vectors stored in the maps banks (151 to 153) respectively, in a way similar to the maps banks (151 to 153) of FIG. 2. The crossbar (123) in FIG. 3 provides the vectors from the maps banks (151) to the vector-vector units (161 to 163) respectively. A same vector stored in the kernel buffer (131) is provided to the vector-vector units (161 to 163).

The vector-vector units (161 to 163) operate concurrently to compute the operation of the corresponding vector operands, stored in the maps banks (151 to 153) respectively, multiplied by the same vector operand that is stored in the kernel buffer (131). For example, the vector-vector unit (161) performs the multiplication operation on the vector operand stored in the maps bank (151) and the vector operand stored in the kernel buffer (131), while the vector-vector unit (163) is concurrently performing the multiplication operation on the vector operand stored in the maps bank (153) and the vector operand stored in the kernel buffer (131).

When the matrix-vector unit (141) of FIG. 3 is implemented in a matrix-matrix unit (121) of FIG. 2, the matrix-vector unit (141) can use the maps banks (151 to 153), the crossbar (123) and the kernel buffer (131) of the matrix-matrix unit (121).

Figure 4:
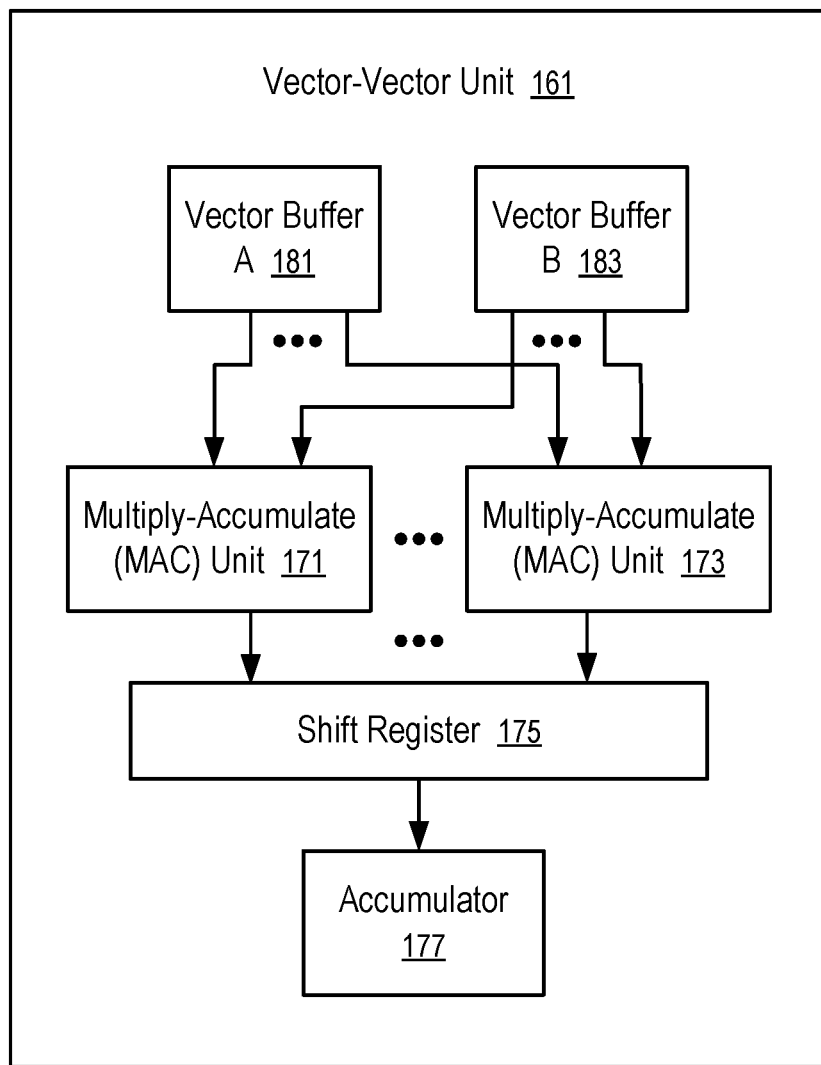
FIG. 4 shows a processing unit configured to perform vector-vector operations according to one embodiment.

Each of the vector-vector units (161 to 163) in FIG. 3 can be implemented in a way as illustrated in FIG. 4.

FIG. 4 shows a processing unit configured to perform vector-vector operations according to one embodiment. For example, the vector-vector unit (161) of FIG. 4 can be used as any of the vector-vector units in the matrix-vector unit (141) of FIG. 3.

In FIG. 4, the vector-vector unit (161) has multiple multiply-accumulate units (171 to 173). Each of the multiply-accumulate units (171 to 173) can receive two numbers as operands, perform multiplication of the two numbers, and add the result of the multiplication to a sum maintained in the multiply-accumulate (MAC) unit.

Each of the vector buffers (181 and 183) stores a list of numbers. A pair of numbers, each from one of the vector buffers (181 and 183), can be provided to each of the multiply-accumulate units (e.g., 173) as input. The multiply-accumulate units (171 to 173) can receive multiple pairs of numbers from the vector buffers (181 and 183) in parallel and perform the multiply-accumulate (MAC) operations in parallel. The outputs from the multiply-accumulate units (171 to 173) are stored into the shift register (175); and an accumulator (177) computes the sum of the results in the shift register (175).

When the vector-vector unit (161) of FIG. 4 is implemented in a matrix-vector unit (141) of FIG. 3, the vector-vector unit (161) can use a maps bank (e.g., 151 or 153) as one vector buffer (181), and the kernel buffer (131) of the matrix-vector unit (141) as another vector buffer (183).

The vector buffers (181 and 183) can have a same length to store the same number/count of data elements. The length can be equal to, or the multiple of, the count of multiply-accumulate units (171 to 173) in the vector-vector unit (161). When the length of the vector buffers (181 and 183) is the multiple of the count of multiply-accumulate units (171 to 173), a number of pairs of inputs, equal to the count of the multiply-accumulate units (171 to 173), can be provided from the vector buffers (181 and 183) as inputs to the multiply-accumulate units (171 to 173) in each iteration; and the vector buffers (181 and 183) feed their elements into the multiply-accumulate units (171 to 173) through multiple iterations.

In one embodiment, the communication bandwidth of the connection (119) between the Deep Learning Accelerator (DLA) (103) and the random access memory (105) is sufficient for the matrix-matrix unit (121) to use portions of the random access memory (105) as the maps banks (151 to 153) and the kernel buffers (131 to 133).

In another embodiment, the maps banks (151 to 153) and the kernel buffers (131 to 133) are implemented in a portion of the local memory (115) of the Deep Learning Accelerator (DLA) (103). The communication bandwidth of the connection (119) between the Deep Learning Accelerator (DLA) (103) and the random access memory (105) is sufficient to load, into another portion of the local memory (115), matrix operands of the next operation cycle of the matrix-matrix unit (121), while the matrix-matrix unit (121) is performing the computation in the current operation cycle using the maps banks (151 to 153) and the kernel buffers (131 to 133) implemented in a different portion of the local memory (115) of the Deep Learning Accelerator (DLA) (103).

Figure 5:
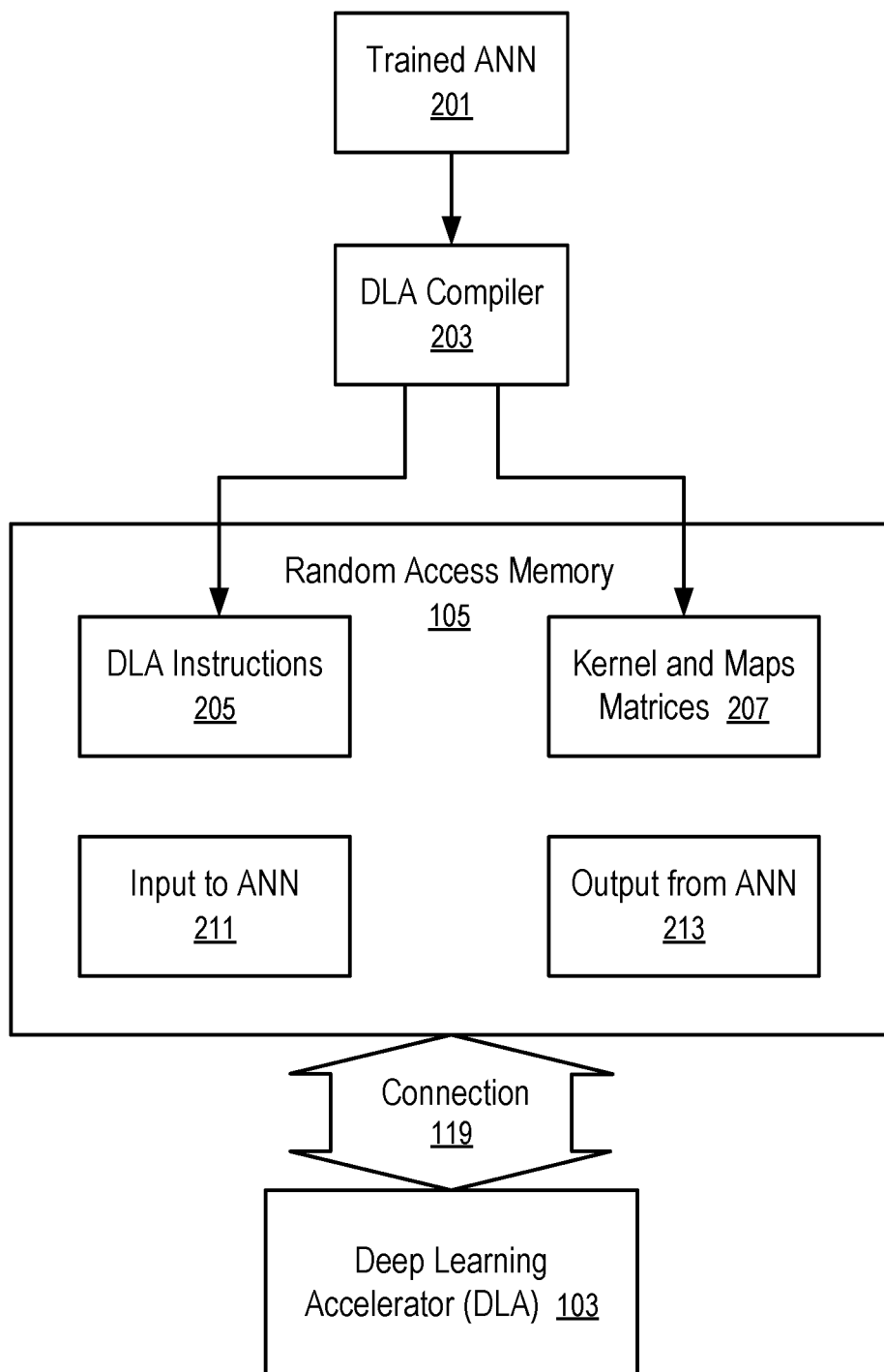
FIG. 5 shows a Deep Learning Accelerator and random access memory configured to autonomously apply inputs to a trained Artificial Neural Network according to one embodiment.

FIG. 5 shows a Deep Learning Accelerator and random access memory configured to autonomously apply inputs to a trained Artificial Neural Network according to one embodiment.

An Artificial Neural Network (201) that has been trained through machine learning (e.g., deep learning) can be described in a standard format (e.g., Open Neural Network Exchange (ONNX)). The description of the trained Artificial Neural Network (201) in the standard format identifies the properties of the artificial neurons and their connectivity.

In FIG. 5, a Deep Learning Accelerator (DLA) compiler (203) converts trained Artificial Neural Network (201) by generating instructions (205) for a Deep Learning Accelerator (DLA) (103) and matrices (207) corresponding to the properties of the artificial neurons and their connectivity. The instructions (205) and the matrices (207) generated by the DLA compiler (203) from the trained Artificial Neural Network (201) can be stored in random access memory (105) for the Deep Learning Accelerator (DLA) (103).

For example, the random access memory (105) and the Deep Learning Accelerator (DLA) (103) can be connected via a high bandwidth connection (119) in a way as in the integrated circuit device (101) of FIG. 1. The autonomous computation of FIG. 5 based on the instructions (205) and the matrices (207) can be implemented in the integrated circuit device (101) of FIG. 1. Alternatively, the random access memory (105) and the Deep Learning Accelerator (DLA) (103) can be configured on a printed circuit board with multiple point to point serial buses running in parallel to implement the connection (119).

In FIG. 5, after the results of the DLA compiler (203) are stored in the random access memory (105), the application of the trained Artificial Neural Network (201) to process an input (211) to the trained Artificial Neural Network (201) to generate the corresponding output (213) of the trained Artificial Neural Network (201) can be triggered by the presence of the input (211) in the random access memory (105), or another indication provided in the random access memory (105).

In response, the Deep Learning Accelerator (DLA) (103) executes the instructions (205) to combine the input (211) and the matrices (207). The execution of the instructions (205) can include the generation of maps matrices for the maps banks (151 to 153) of one or more matrix-matrix units (e.g., 121) of the Deep Learning Accelerator (DLA) (103).

In some embodiments, the inputs (211) to the Artificial Neural Network (201) is in the form of an initial maps matrix. Portions of the initial maps matrix can be retrieved from the random access memory (105) as the matrix operand stored in the maps banks (151 to 153) of a matrix-matrix unit (121). Alternatively, the DLA instructions (205) also include instructions for the Deep Learning Accelerator (DLA) (103) to generate the initial maps matrix from the input (211).

According to the DLA instructions (205), the Deep Learning Accelerator (DLA) (103) loads matrix operands into the kernel buffers (131 to 133) and maps banks (151 to 153) of its matrix-matrix unit (121). The matrix-matrix unit (121) performs the matrix computation on the matrix operands. For example, the DLA instructions (205) break down matrix computations of the trained Artificial Neural Network (201) according to the computation granularity of the Deep Learning Accelerator (DLA) (103) (e.g., the sizes/dimensions of matrices that loaded as matrix operands in the matrix-matrix unit (121)) and applies the input feature maps to the kernel of a layer of artificial neurons to generate output as the input for the next layer of artificial neurons.

Upon completion of the computation of the trained Artificial Neural Network (201) performed according to the instructions (205), the Deep Learning Accelerator (DLA) (103) stores the output (213) of the Artificial Neural Network (201) at a predefined location in the random access memory (105), or at a location specified in an indication provided in the random access memory (105) to trigger the computation.

When the technique of FIG. 5 is implemented in the integrated circuit device (101) of FIG. 1, an external device connected to the memory controller interface (107) can write the input (211) into the random access memory (105) and trigger the autonomous computation of applying the input (211) to the trained Artificial Neural Network (201) by the Deep Learning Accelerator (DLA) (103). After a period of time, the output (213) is available in the random access memory (105); and the external device can read the output (213) via the memory controller interface (107) of the integrated circuit device (101).

For example, a predefined location in the random access memory (105) can be configured to store an indication to trigger the autonomous execution of the instructions (205) by the Deep Learning Accelerator (DLA) (103). The indication can optionally include a location of the input (211) within the random access memory (105). Thus, during the autonomous execution of the instructions (205) to process the input (211), the external device can retrieve the output generated during a previous run of the instructions (205), and/or store another set of input for the next run of the instructions (205).

Optionally, a further predefined location in the random access memory (105) can be configured to store an indication of the progress status of the current run of the instructions (205). Further, the indication can include a prediction of the completion time of the current run of the instructions (205) (e.g., estimated based on a prior run of the instructions (205)). Thus, the external device can check the completion status at a suitable time window to retrieve the output (213).

In some embodiments, the random access memory (105) is configured with sufficient capacity to store multiple sets of inputs (e.g., 211) and outputs (e.g., 213). Each set can be configured in a predetermined slot/area in the random access memory (105).

The Deep Learning Accelerator (DLA) (103) can execute the instructions (205) autonomously to generate the output (213) from the input (211) according to matrices (207) stored in the random access memory (105) without helps from a processor or device that is located outside of the integrated circuit device (101).

In a method according to one embodiment, random access memory (105) of a computing device can be accessed using an interface (107) of the computing device to a memory controller. The computing device can have processing units (e.g., 111) configured to perform at least computations on matrix operands, such as a matrix operand stored in maps banks (151 to 153) and a matrix operand stored in kernel buffers (131 to 133).

For example, the computing device can be enclosed within an integrated circuit package; and a set of connections can connect the interface (107) to the memory controller that is located outside of the integrated circuit package.

Instructions (205) executable by the processing units (e.g., 111) can be written into the random access memory (105) through the interface (107).

Matrices (207) of an Artificial Neural Network (201) can be written into the random access memory (105) through the interface (107). The matrices (207) identify the property and/or state of the Artificial Neural Network (201).

Optionally, at least a portion of the random access memory (105) is non-volatile and configured to store the instructions (205) and the matrices (07) of the Artificial Neural Network (201).

First input (211) to the Artificial Neural Network can be written into the random access memory (105) through the interface (107).

An indication is provided in the random access memory (105) to cause the processing units (111) to start execution of the instructions (205). In response to the indication, the processing units (111) execute the instructions to combine the first input (211) with the matrices (207) of the Artificial Neural Network (201) to generate first output (213) from the Artificial Neural Network (201) and store the first output (213) in the random access memory (105).

For example, the indication can be an address of the first input (211) in the random access memory (105); and the indication can be stored a predetermined location in the random access memory (105) to cause the initiation of the execution of the instructions (205) for the input (211) identified by the address. Optionally, the indication can also include an address for storing the output (213).

The first output (213) can be read, through the interface (107), from the random access memory (105).

For example, the computing device can have a Deep Learning Accelerator (103) formed on a first integrated circuit die and the random access memory (105) formed on one or more second integrated circuit dies. The connection (119) between the first integrated circuit die and the one or more second integrated circuit dies can include Through-Silicon Vias (TSVs) to provide high bandwidth for memory access.

For example, a description of the Artificial Neural Network (201) can be converted using a compiler (203) into the instructions (205) and the matrices (207). The combination of the instructions (205) and the matrices (207) stored in the random access memory (105) and the Deep Learning Accelerator (103) provides an autonomous implementation of the Artificial Neural Network (201) that can automatically convert input (211) to the Artificial Neural Network (201) to its output (213).

For example, during a time period in which the Deep Learning Accelerator (103) executes the instructions (205) to generate the first output (213) from the first input (211) according to the matrices (207) of the Artificial Neural Network (201), the second input to Artificial Neural Network (201) can be written into the random access memory (105) through the interface (107) at an alternative location. After the first output (213) is stored in the random access memory (105), an indication can be provided in the random access memory to cause the Deep Learning Accelerator (103) to again start the execution of the instructions and generate second output from the second input.

During the time period in which the Deep Learning Accelerator (103) executes the instructions (205) to generate the second output from the second input according to the matrices (207) of the Artificial Neural Network (201), the first output (213) can be read from the random access memory (105) through the interface (107); and a further input can be written into the random access memory to replace the first input (211), or written at a different location. The process can be repeated for a sequence of inputs.

The Deep Learning Accelerator (103) can include at least one matrix-matrix unit (121) that can execute an instruction on two matrix operands. The two matrix operands can be a first matrix and a second matrix. Each of two matrices has a plurality of vectors. The matrix-matrix unit (121) can include a plurality of matrix-vector units (141 to 143) configured to operate in parallel. Each of the matrix-vector units (141 to 143) are configured to operate, in parallel with other matrix-vector units, on the first matrix and one vector from second matrix. Further, each of the matrix-vector units (141 to 143) can have a plurality of vector-vector units (161 to 163) configured to operate in parallel. Each of the vector-vector units (161 to 163) is configured to operate, in parallel with other vector-vector units, on a vector from the first matrix and a common vector operand of the corresponding matrix-vector unit. Further, each of the vector-vector units (161 to 163) can have a plurality of multiply-accumulate units (171 to 173) configured to operate in parallel.

The Deep Learning Accelerator (103) can have local memory (115) and a control unit (113) in addition to the processing units (111). The control unit (113) can load instructions (205) and matrix operands from the random access memory (105) for execution by the processing units (111). The local memory can cache matrix operands used by the matrix-matrix unit. The connection (119) can be configured with a bandwidth sufficient to load a set of matrix operands from the random access memory (105) to the local memory (115) during a time period in which the matrix-matrix unit performs operations on two other matrix operands. Further, during the time period, the bandwidth is sufficient to store a result, generated by the matrix-matrix unit (121) in a prior instruction execution, from the local memory (115) to the random access memory (105).

At least some embodiments disclosed herein provide systems, methods and apparatus of an intelligent radar that is powered by the Deep Learning Accelerator (103) to convert its radar image data into a compact description of features recognized using an Artificial Neural Network. Optionally, the recognition of the features can be enhanced via and/or assisted by optical images of the corresponding features captured by a digital camera.

For example, a radar can scan a scene to obtain a radar image that represents the points of objects or items that reflect radar waves emitted from the radar. For example, the radar can transmit radio waves in pulses at one direction at a time. A radio wave pulse transmitted at a particular direction may be reflected by a portion of an object back to the radar to provide information on the distance and speed of the portion of the object relative to the radar. The information can be represented as a point on a two-dimensional radar image where the position of the point corresponds to the direction of the radio wave pulse. The radar can scan a portion of the three-dimensional space of its surrounding for objects by sending the radio wave pulses in different directions. Alternatively, the position of the point that reflects the radio wave pulse can be presented in a three-dimensional space to show other information about the point, such as speed, the reflectiveness of the point on the object, etc. Thus, the radar image can be presented in the form of points in a three-dimensional space.

The radar image can be analyzed using an artificial neural network to identify attributes of an object as a whole captured on the radar image, such as the size of the object, the distance of the object, the speed of the object, etc.

Optionally, a digital camera can be used to obtain images of the corresponding points that reflect and/or emit visible lights and/or infrared lights. The radar image, and optionally the optional images from the digital camera, can be stored in the random access memory (105) of the integrated circuit device (101) as an input (211) to an Artificial Neural Network (201). The Deep Learning Accelerator (103) executes the DLA instructions (205) to generate the output (213) of the Artificial Neural Network (201).

The Artificial Neural Network (201) is trained to recognize the features captured in the input (211). Thus, the output of the Artificial Neural Network (201) can contain the characterizations of the recognized features, such as identifiers or classifications of the features, the positions and speeds of the object/item represented by the features, the sizes of the features, etc. Optionally, representative images of the features can be extracted from the radar image to illustrate the features. Thus, the large volume of radar data can be reduced into the characterizations that are of interest to a specific application and that have a much smaller data size.

The intelligent radar can be used in an autonomous vehicle or drone for obstacle avoidance, lane keeping, blind spot detection, rear collision warning, cross traffic alert, adaptive cruise control, etc. The radar can determine the location and speed of a vehicle on a road by recognizing a cloud of points in a radar image as a vehicle. Optionally, an optical image of the vehicle as captured by a digital camera can further improve the confidence level of the recognition of the vehicle in the radar image and/or provide addition information about the vehicle detected by the radar. Thus, instead of presenting a radar image showing the speed and positions of the individual points on the radar image, the radar can output data identifying the presence of the vehicle and its position and speed.

For example, the vehicle can be identified by its classification or category as recognized by the Artificial Neural Network (201) from the radar image and/or the optical image.

Optionally, the radar can further identify the orientation of the vehicle relative to the radar based on a combination of the radar image and the optical image.

Optionally, the Artificial Neural Network (201) can identify the cloud of points in the radar image that represents the vehicle and crop the radar image to show the portion representative of the vehicle and thus discard and/or filter out other portions of the radar images that are not of interest to an application. Similarly, the Artificial Neural Network (201) can extract the optical image of the vehicle from the images captured by the digital camera.

Optionally, the radar can buffer the extracted images of the vehicle and/or other images for a period of time for retrieval on demand. Thus, when the host system is not interested in the images, the radar does not transmit the image data to the host system and can discard the images after the period of time.

Thus, instead of providing the raw radar data/image to a host system, the intelligent radar can provide a description of objects or items as recognized by the Artificial Neural Network (201) to the host system to reduce the data traffic to the host system and/or reduce the computation workload of the host system. The description can be used in the host system to support autonomous operations and/or Advanced Driver-Assistance. For example, the host system can be a vehicle or a drone.

Figure 6:
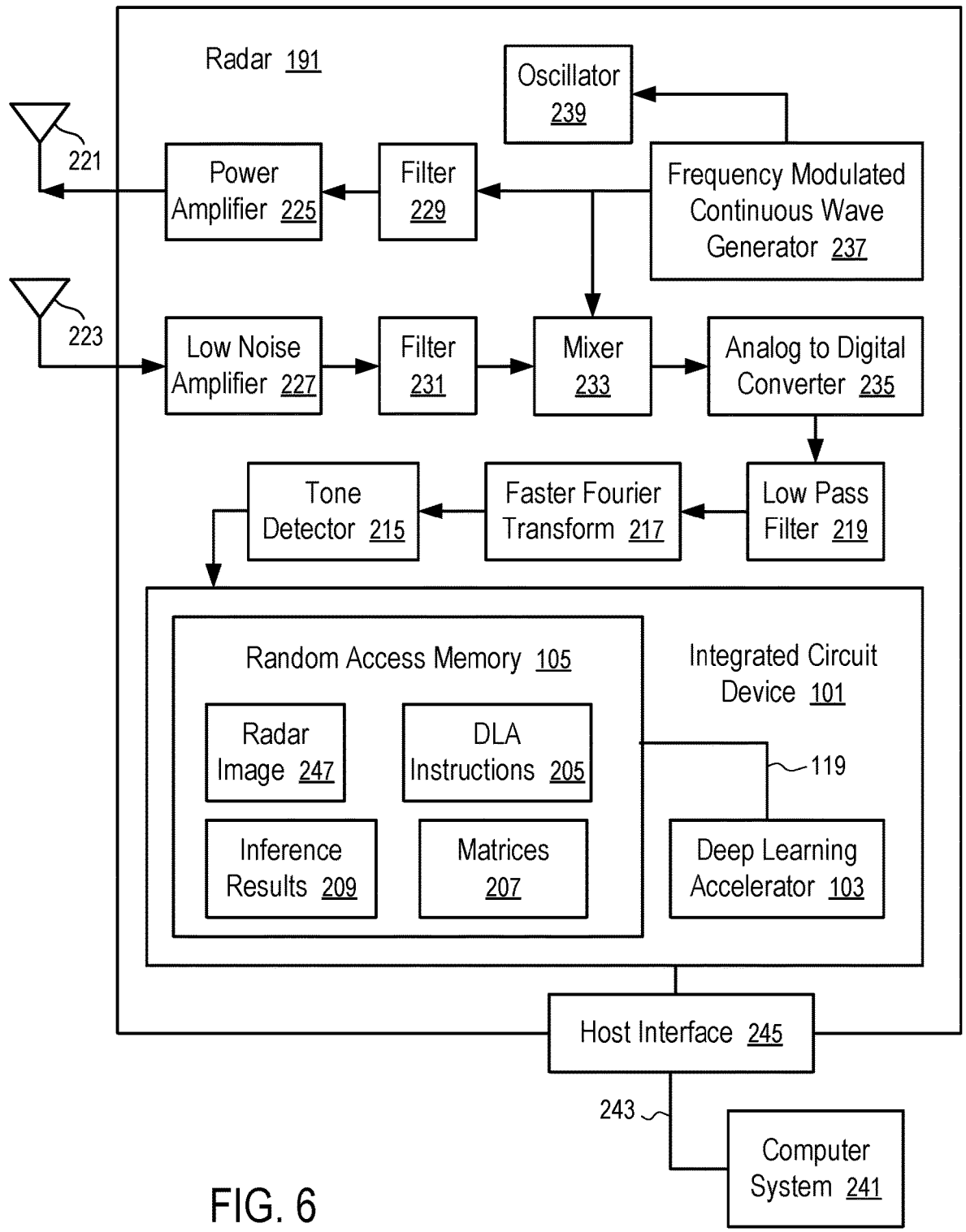
FIG. 6 shows a radar according to one embodiment.

FIG. 6 shows a radar according to one embodiment.

In FIG. 6, the radar (191) includes a frequency modulated continuous wave generator (237) that is configured to modulate the signals from the oscillator (239). A power amplifier (225) amplifies the Frequency Modulated Continuous Wave (FMCW) passing through a filter (229) for transmission via a transmission antenna (221). When the Frequency Modulated Continuous Wave (FMCW) emitted from the antenna (221) is reflected by an object, the reflected FMCW is received at a receiving antenna (223). A low noise amplifier (227) amplifies the signals from the receiving antenna (223); and the filter (231) allows the reflected and amplified Frequency Modulated Continuous Wave (FMCW) to enter a mixer (233). The mixer (233) combines the Frequency Modulated Continuous Wave (FMCW) from the generator (237) and the amplified Frequency Modulated Continuous Wave (FMCW) from the receiving antenna (223). An analog to digital converter (235) converts the results of the mixer (233) into digital signals. A low pass filter (219) is configured to block the high frequency signals that have the frequency of signals from the oscillator (239) or higher. The output of the low pass filter (219) provides a beat signal resulting from mixing the Frequency Modulated Continuous Wave (FMCW) from the generator (237) for transmission and the Frequency Modulated Continuous Wave (FMCW) from the receiving antenna (223). A faster Fourier transform (217) is performed to allow a tone detector (215) to determine the frequency of the beat signal. A beat signal frequency can be used to determine the Doppler shift in the reflected Frequency Modulated Continuous Wave (FMCW) received in the antenna (223) and thus the relative speed of the object reflecting the Frequency Modulated Continuous Wave (FMCW) and the receiving antenna (223). Further, a delay between the transmitted FMCW and the received Frequency Modulated Continuous Wave (FMCW) can be used to determine the round-trip distance from the transmission antenna (221), to the object reflecting the Frequency Modulated Continuous Wave (FMCW), and back to the receiving antenna (223).

The speed of, and the distance to, a point of reflection of the Frequency Modulated Continuous Wave (FMCW) provide the radar information of a pixel or point of the radar image (247) corresponding to a direction of transmission of the Frequency Modulated Continuous Wave (FMCW) and/or a position of the reflection point. Different directions of the transmission of the FMCW can provide radar information of different pixels or points of the radar image (247). The collections of the speed and/or distance of the points of reflection of the Frequency Modulated Continuous Wave (FMCW) provide the radar image (247).

The radar image (247) can be stored in random access memory (105) of the radar (191) in a cyclic way, where the newest radar image (247) is written over the oldest radar image (247). Further, the random access memory (105) of the radar (191) stores the DLA instructions (205) and DLA matrices (207) generated by a compiler (203) from a description of the Artificial Neural Network (ANN) (201). A Deep Learning Accelerator (103) of the integrated circuit device (101) can execute the DLA instructions (205) in response to the new radar image (247) being written into the Random Access Memory (105) to implement the computation of the Artificial Neural Network (ANN) (201). For example, the Artificial Neural Network (ANN) (201) can be configured to receive the radar image (247) as an input (211) to generate inference results (209) as an output (213). The radar (191) has a host interface (245) that is configured to provide the inference results (209) to a host system, such as a computer of a vehicle having an Advanced Driver-Assistance Systems (ADAS), a drone, etc.

For example, the inference result (209) can include the identification of an object captured in the radar image (247), the location and speed of the object relative to the radar (191), the size of the object, one or more classification of the object, and/or an extracted portion of the radar image (247) that shows the object.

Figure 7:
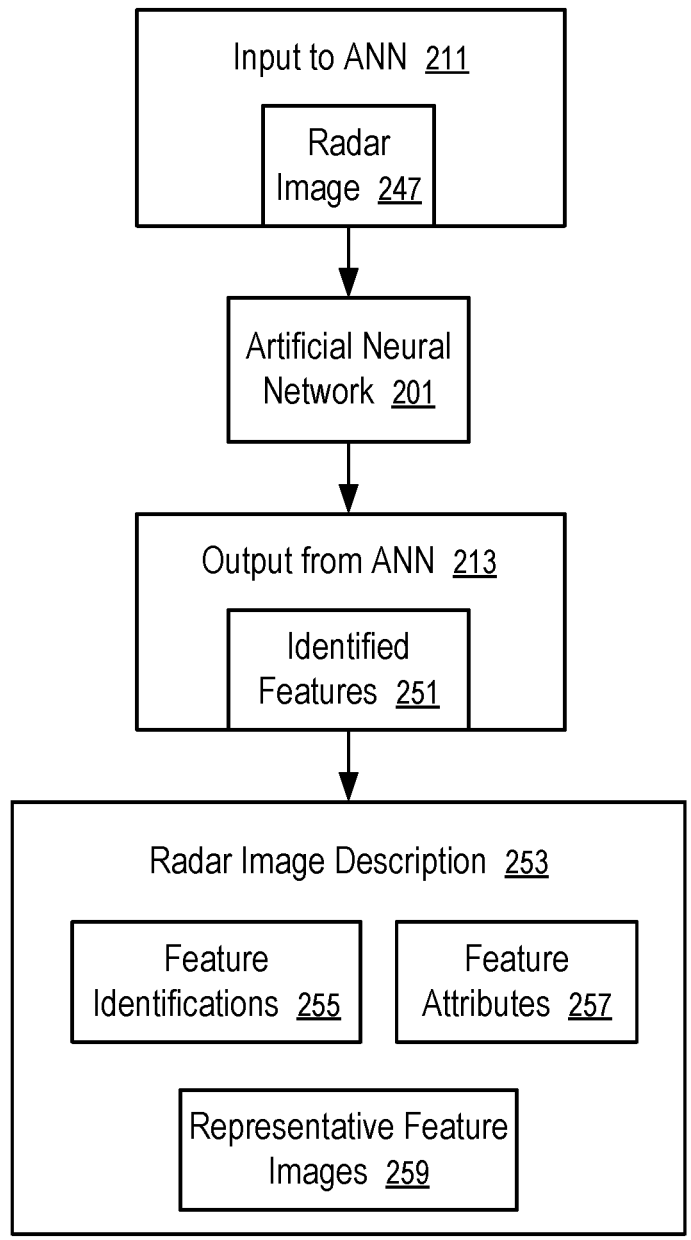
FIG. 7 illustrates the generation of an intelligent output of a radar using an artificial neural network according to one embodiment.

FIG. 7 illustrates the generation of an intelligent output of a radar using an artificial neural network according to one embodiment.

In FIG. 7, a radar image (247) is provided as part of an input (211) to an Artificial Neural Network (201) to generate an output (213). The output (213) specifies features (251) identified by the Artificial Neural Network (201) in the radar image (247).

A feature (251) is representative of a group of pixels or points in the radar image (247). The group of pixels or points is recognized for corresponding to an object (e.g., a vehicle, a structure, or an item) that reflects the radio waves from the radar. The feature (251) typically has an identification (255) and attributes (257) such as a size, a position, a speed, one or more classifications, a confidence level of a classification of the object, and/or an orientation of the object relative to the radar. The Artificial Neural Network (201) determines the attributes from the input (211) such that the group of pixels or points in the radar image (247) can be replaced with the data representative of the attributes of the feature (251).

Optionally, the feature (251) can include the group of pixels or points extracted from the radar image (247) as a representative feature image (259). In some implementations, a feature (251) can have a classification of "unknown"; and a host system may decide to further analyze the feature (251) based on the group of pixels or points extracted from the radar image (247) for the feature (251).

Thus, the radar image (247) can be converted into a radar image description (253) using the Artificial Neural Network (201). The data size of the description (253) is substantially smaller than the data size of the radar image (247). A typical host system of the radar (191) is more interested in the features (251) than the individual pixels or points of the entire radar image (247).

The Artificial Neural Network (201) can be customized for the application of the host system of the radar (191). For example, different host systems can have different interests in classifications of the features. For example, some host systems are interested in the orientations of the objects represented by the features (251); and other host systems may only need the speed and position of an object. For example, some hosts are interested in features having a size that is above a threshold; and other hosts may not be interested in objects in a particular classification or category. Thus, the radar image description (253) and/or the identification of features (251) can be customized based on the radar usage of the host system.

Optionally, optical images can be used to assist the identification of some attributes of features. For example, an optical image obtained from a digital camera can be used to determine a classification of the object corresponding to the feature (251) and/or the orientation of the object. Thus, the input (211) can include optical images from one or more digital cameras, as illustrated in FIGS. 8 and 9.

Figure 8:
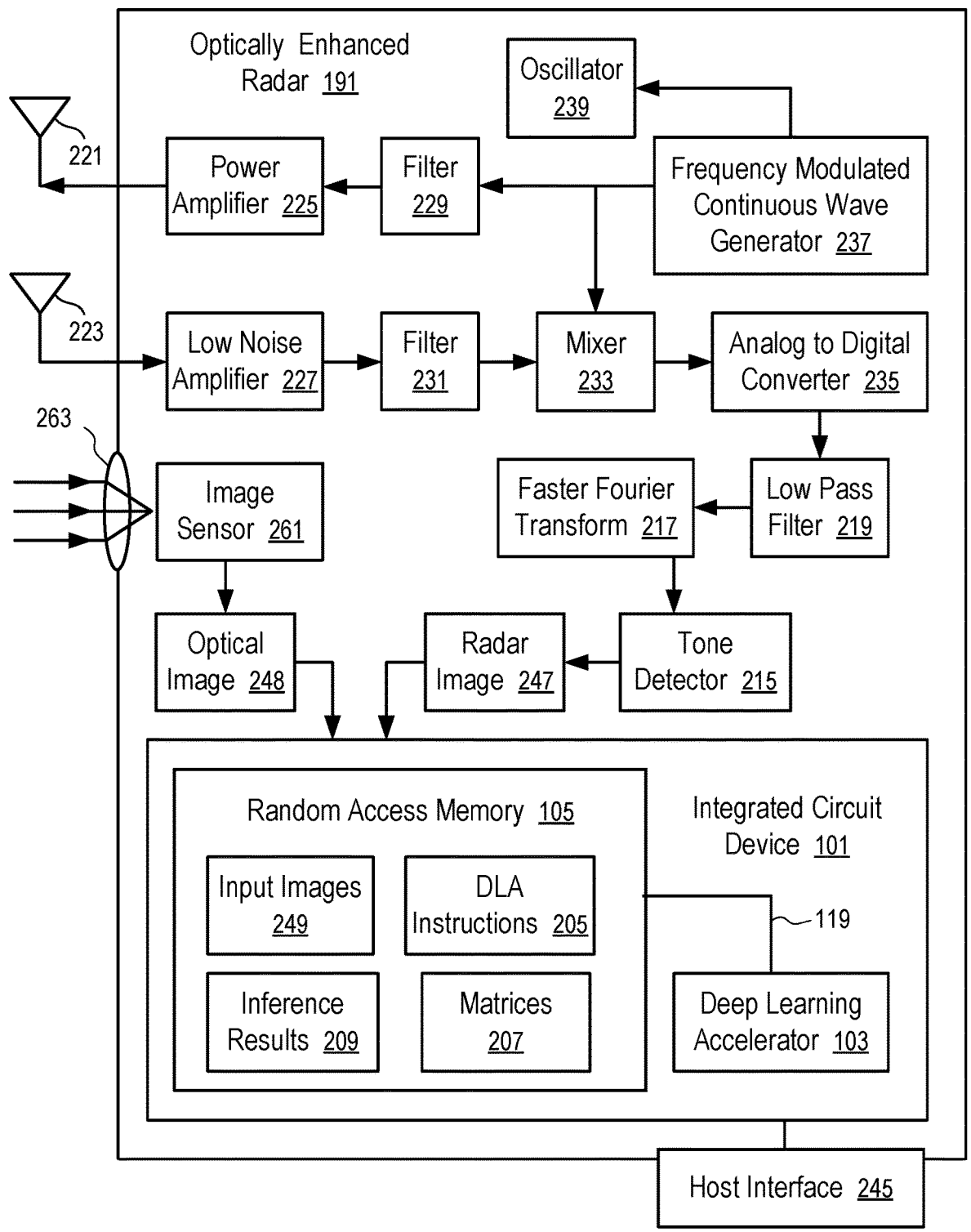
FIGS. 8 and 9 show optically enhanced radars according to some embodiments.
Figure 9:
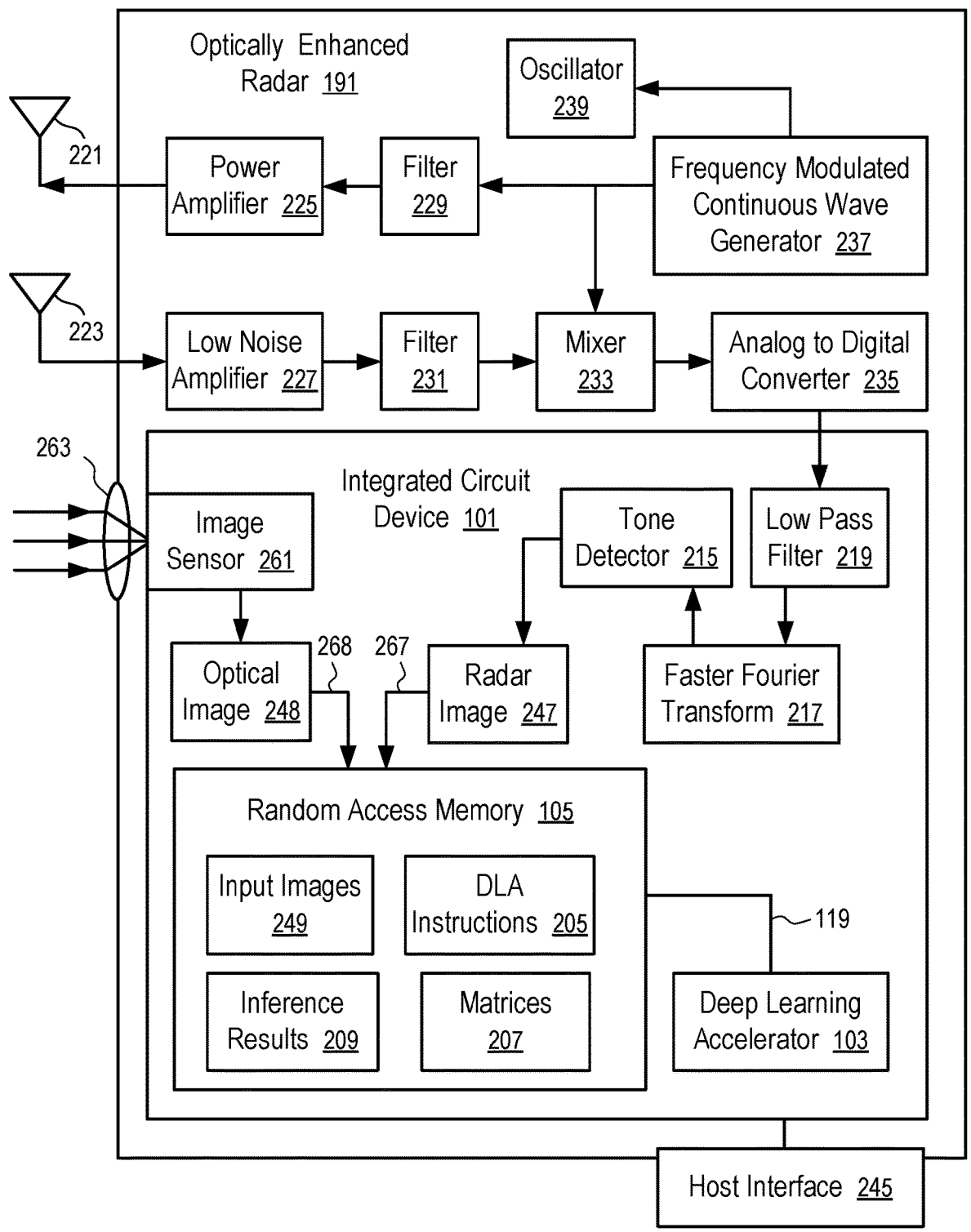

FIGS. 8 and 9 show optically enhanced radars according to some embodiments.

In FIG. 8, the radar (191) includes an image sensor (261) that is configured to capture, through its lens (263), optical images (248) of the scene that is being scanned using the radar waves transmitted and received via the antennas (221 and 223).

The image sensor (261) generates the optical image (248) concurrently with the tone detector (215) generating the radar image (247). The images (249) are written into the Random Access Memory (105) as the input (211) to the Artificial Neural Network (201). The Artificial Neural Network (201) can be trained to use the optical image (248) in assisting the determination of identified features (251).

For example, visual cues observable in the optical image (248) can be helpful in segmenting the pixels or points in the radar image (247). The depth information represented by the distances to the points that reflects radar waves can also be useful in segmenting the pixels of the optical image (248). Further, visual cues observable in the optical image (248) may not have corresponding counterparts in the radar image (247); and such visual cues can be used in the Artificial Neural Network (201) to assist the classification of a feature (251) and/or improve the confidence level of the classification.

In some embodiments, some of the circuits of the radar (191) and/or the image sensor (261) are also integrated inside the package of the integrated circuit device (101), as illustrated in FIG. 9.

In FIG. 9, the image sensor (261) is formed on an integrated circuit die that can be packaged on the top of the integrated circuit device (101); and the low pass filter (219), the faster Fourier transform (217), and/or the tone detector (215) can be formed on another integrated circuit die arranged at the bottom of the integrated circuit device (101). The deep learning accelerator (103) can be implemented in a Field-Programmable Gate Array (FPGA) or Application Specific Integrated circuit (ASIC). The tone detector (215) has a connection (267) to write the radar image (247) into the Random Access Memory (105). The image sensor (261) has a separate connection (268) to write the optical images (248) into the Random Access Memory (105), concurrently with the tone detector (215) writing the radar image (247) into the Random Access Memory (105). The integrated circuit dies of the Random Access Memory (105) and the Deep Learning Accelerator (103) can be sandwiched between the integrated circuit dies of the image sensor (261) and the tone detector (215).

Since the radar image (247) and the optical image (248) are generated and consumed within the integrated circuit device (101), the requirement on the communication bandwidth from the integrated circuit device (101) to external devices (e.g., a host system) can be reduced.

For example, a serial communication connection (243) can be used to connect a host interface (245) of the radar (191) to a host computer system (241). The radar image description (253) can be streamed from the radar (191) to the host computer system (241) over the serial communication connection (243). Alternatively, a wired or wireless computer connection can be used to provide the radar image description (253) to a host computer system (241).

Figure 10:
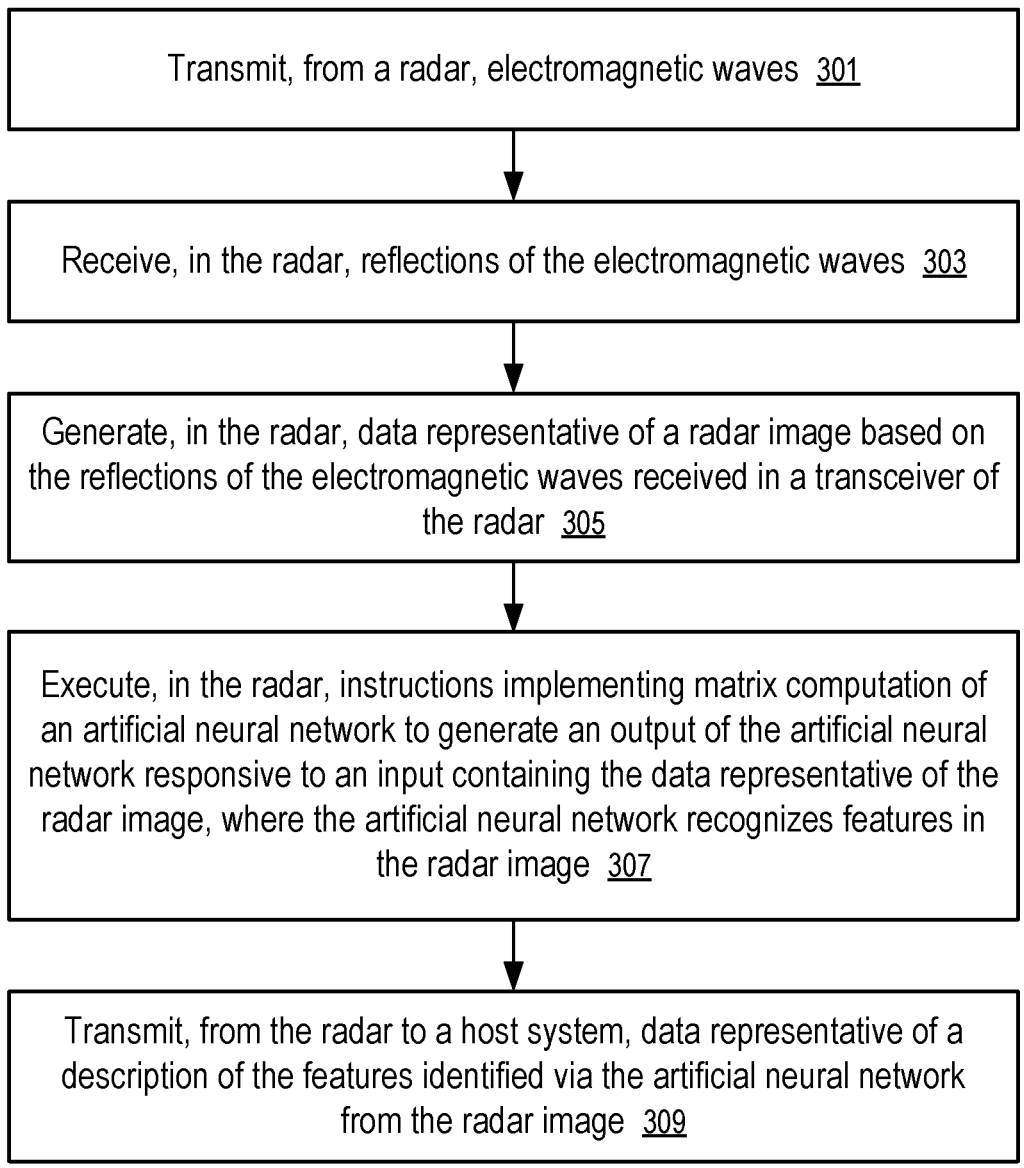
FIG. 10 shows a method implemented in a radar according to one embodiment.

FIG. 10 shows a method implemented in a radar according to one embodiment. For example, the method of FIG. 10 can be implemented in a radar (191) of FIG. 6, FIG. 8, and/or FIG. 9.

At block 301, a radar (191) transmits electromagnetic waves.

At block 303, the radar (191) receives reflections of the electromagnetic waves.

For example, the radar (191) can have a power amplifier (225) to transmit the electromagnetic waves via a transmission antenna (221) and a low noise amplifier (227) to receive the reflections via a receiving antenna (223). In some embodiments, a same antenna is used for both transmitting the electromagnetic waves and receiving the reflections. A transceiver of the radar (191) can have separate circuits for transmission and for receiving. Alternatively, a transceiver of the radar (191) can share a portion of circuits for transmission and for receiving.

At block 305, the radar (191) generates data representative of a radar image (247) based on the reflections of the electromagnetic waves received in the transceiver of the radar (191).

At block 307, the radar (191) executes instructions implementing matrix computation of an artificial neural network (201) to generate an output (213) of the artificial neural network (201) that is responsive to an input (211) containing the data representative of the radar image (247). The artificial neural network (201) recognizes/identifies features in the radar image (247).

At block 309, the radar (191) transmits, to a host system, data representative of a description (253) of the features (251) identified via the artificial neural network (201) from the radar image (247).

For example, the host system can be a computer system (241) of a vehicle or drone for autonomous operations, or for advanced driver-assistance.

For example, the description (253) can include an identifier of a feature, a classification of the feature, a portion extracted from the radar image (247) showing the feature, an orientation of an object represented by the feature, a position of the object, or a speed of the object, or any combination therein.

For example, the radar (191) can include a circuit to generate data representative of the radar image (247) based on the reflections of the radar waves. The circuit can include a tone detector (215), a faster Fourier transform (217), and/or a low pass filter (219) that receives an input from an analog to digital converter (235).

Optionally, the radar (191) can further include an image sensor (261) configured to generate data representative of an optical image (248) of a scene corresponding to the radar image (247).

The radar (191) can have the random access memory (105) configured to store the data representative of the radar image (247) and, optionally, the data representative of the optical image (248) as part of the input (211) to the artificial neural network (201).

For example, the radar (191) can capture the optical image (248) in parallel with capturing the radar image (247). Separate connections (267 and 268) can be used to write the optical image (248) and the radar image (247) in parallel to the random access memory (105) as an input (211) to the artificial neural network (201). Further, the Deep Learning Accelerator (103) can have a further connection (119) to access the random access memory (105).

Optionally, after the transmission of the data representative of the description (253) to the host system, the radar (191) may store the input (211) in the random access memory (105) for a predetermined period of time. Within the predetermined period of time, the host system may optionally send a request to the radar (191) to retrieve the input (211), or a portion of it, that is used to generate the description (253). If such a request is received, the radar (191) transmits the input (211), or the requested portion of it, to the host system. After the predetermined period of time, the radar (191) erases the input (211) from the Random Access Memory (105). For example, radar images and/or optical images generated in a subsequent time period can be stored into the slot of random access memory (105) that is previously used for storing the input (211) from a previous time period. Writing the new input into the slot erases the old input.

Figure 11:
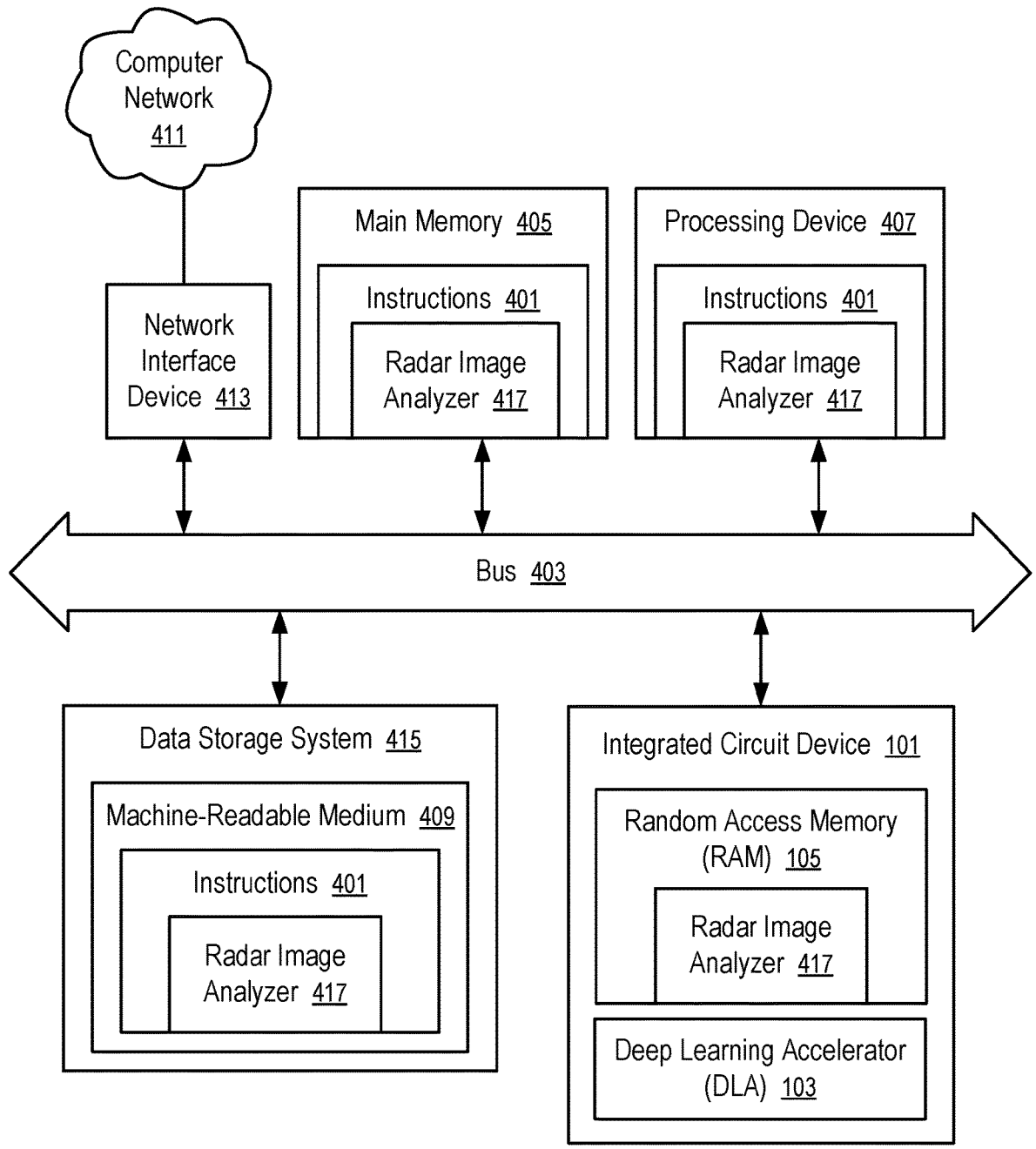
FIG. 11 a block diagram of an example computer system in which embodiments of the present disclosure can operate.

FIG. 11 illustrates an example machine of a computer system within which a set of instructions, for causing the machine to perform any one or more of the methodologies discussed herein, can be executed. For example, the methodologies discussed in connection with FIG. 11 can be implemented via the set of instruction.

In some embodiments, the computer system of FIG. 11 can implement a system of FIGS. 6, 8 and/or 9 with a radar image analyzer (417) configured to perform the operations discussed in connection with FIGS. 6 to 10.

The computer system of FIG. 11 can be used to perform the operations of a radar image analyzer (417) described with reference to FIGS. 1-10 by executing instructions configured to perform the operations corresponding to the radar image analyzer (417).

In some embodiments, the machine can be connected (e.g., networked) to other machines in a Local Area Network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a Personal Digital Assistant (PDA), a cellular telephone, a surveillance camera, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 11 includes a processing device (407), a main memory (405), and a data storage system (415), which communicate with each other via a bus (403). For example, the processing device (407) can include one or more microprocessors; the main memory (405) can include read-only memory (ROM), flash memory, dynamic random access memory (DRAM), such as synchronous DRAM (SDRAM) or Rambus DRAM (RDRAM), static random access memory (SRAM), etc. The bus (403) can include, or be replaced with, multiple buses.

The processing device (407) in FIG. 11 can include one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Alternatively, or in combination, the processing device (407) can include one or more special-purpose processing devices such as an application specific integrated circuit (ASIC), a field programmable gate array (FPGA), a digital signal processor (DSP), a network processor, or the like. The processing device (407) is configured to execute instructions (401) for performing the operations discussed in connection with the radar image analyzer (417).

The computer system of FIG. 11 can further include a network interface device (413) to communicate over a computer network (411).

The data storage system (415) can include a machine-readable medium (409) (also known as a computer-readable medium) on which is stored one or more sets of instructions (401) or software embodying any one or more of the methodologies or functions described herein. The instructions (401) can also reside, completely or at least partially, within the main memory (405) and/or within the processing device (407) during execution thereof by the computer system, the main memory (405) and the processing device (407) also constituting machine-readable storage media.

In one embodiment, the instructions (401) include instructions to implement functionality corresponding to a radar image analyzer (417), such as the radar image analyzer (417) described with reference to FIGS. 1-10. While the machine-readable medium (409) is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus, comprising:
   a radar, having:
      a transceiver configured to transmit radar waves and receive reflections of the radar waves;
      a circuit configured to generate data representative of a radar image based on the reflections of the radar waves received in the transceiver;
      at least one processing unit configured to execute instructions implementing matrix computation of an artificial neural network, wherein the at least one processing unit includes a matrix-matrix unit configured to operate on two matrix operands of an instruction;
      random access memory configured to store data representative of matrices of the artificial neural network and instructions executable by the at least one processing unit to generate an output of the artificial neural network having the radar image as an input, wherein the artificial neural network is configured to identify features in the radar image in the output;

an image sensor configured in an integrated circuit device containing the random access memory; and a host interface operatable to provide a wired or wireless connection between the radar and a host system, wherein the radar is configured to transmit, via the wired or wireless connection to the host system, data representative of a description of the features identified via the artificial neural network from the radar image;

wherein the image sensor is configured to:
capture an optical image of a scene corresponding to the radar image; and
write data representative of the optical image into the random access memory of the radar as part of the input to the artificial neural network;

wherein the circuit is configured to write the data representative of the radar image into the random access memory of the radar as part of the input to the artificial neural network in parallel with the image sensor writing of the data representative of the optical image into the random access memory; and wherein the radar is configured to:
store the input in the random access memory of the radar for a predetermined period of time after transmission of the data representative of the description to the host system;
receive, within the predetermined period of time, a request from the host system;
transmit the input to the host system; and
erase the input from the radar after the predetermined period of time.

2. The apparatus of claim 1, wherein the image sensor is formed on an integrated circuit die and packaged in a same integrated circuit device that contains the random access memory.

3. The apparatus of claim 2, wherein the at least one processing unit is formed on an integrated circuit die as a field-programmable gate array (FPGA) or application specific integrated circuit (ASIC); the random access memory is formed on one or more integrated circuit dies; and the at least one processing unit and the random access memory are packaged in the same integrated circuit device.

4. The apparatus of claim 3, wherein the image sensor and the circuit configured to generate the data representative of the radar image have separate connections to write image data into the random access memory concurrently.

5. The apparatus of claim 3, wherein the field-programmable gate array (FPGA) or application specific integrated circuit (ASIC) implements a deep learning accelerator, the deep learning accelerator comprising the at least one processing unit, and a control unit configured to load the instructions from the random access memory for execution.

6. The apparatus of claim 5, wherein the matrix-matrix unit includes a plurality of matrix-vector units configured to operate in parallel;
wherein each of the plurality of matrix-vector units includes a plurality of vector-vector units configured to operate in parallel; and
wherein each of the plurality of vector-vector units includes a plurality of multiply-accumulate units configured to operate in parallel.

7. The apparatus of claim 2, wherein at least portion of the circuit configured to generate the data representative of the radar image is packaged within the same integrated circuit device that contains the random access memory.

8. The apparatus of claim 7, wherein the data representative of the radar image and the data representative of the optical image are generated and consumed within the same integrated circuit device as the input to the artificial neural network.

9. A method, comprising:
transmitting, from a radar, electromagnetic waves;
receiving, in the radar, reflections of the electromagnetic waves;
generating, in the radar, data representative of a radar image based on the reflections of the electromagnetic waves received in a transceiver of the radar;
executing, in the radar, instructions implementing matrix computation of an artificial neural network to generate an output of the artificial neural network responsive to an input containing the data representative of the radar image, the artificial neural network configured to recognize features in the radar image; and
transmitting, from the radar to a host system, data representative of a description of the features identified via the artificial neural network from the radar image;
capturing, using an image sensor of the radar, an optical image of a scene corresponding to the radar image;
writing data representative of the optical image into random access memory of the radar as part of the input to the artificial neural network, the random access memory and the image sensor being configured in a same integrated circuit device;
writing the data representative of the radar image into the random access memory of the radar as part of the input to the artificial neural network in parallel with the writing of the data representative of the optical image into the random access memory;
storing the input into the random access memory of the radar for a predetermined period of time after the transmitting of the data representative of the description to the host system;
receiving, within the predetermined period of time, a request from the host system;
transmitting the input to the host system; and
erasing the input from the radar after the predetermined period of time.

10. The method of claim 9, wherein the description includes an identifier of a feature, a classification of the feature, a portion extracted from the radar image showing the feature, an orientation of an object represented by the feature, a position of the object, or a speed of the object, or any combination therein.

11. A device, comprising:
a radar, having:
random access memory;
a circuit configured to generate data representative of a radar image based on reflections of electromagnetic waves and write the data to the random access memory as an input to an artificial neural network;
a field-programmable gate array (FPGA) or application specific integrated circuit (ASIC) having:
a memory interface to access the random access memory; and
at least one processing unit configured to execute instructions having matrix operands to implement computations of the artificial neural network, the artificial neural network configured to identify one or more features in the radar image in an output;
an image sensor configured in an integrated circuit device containing the random access memory; and
a host interface configured to output, to a host system, data representative of attributes of the one or more features;

wherein the image sensor is configured to:
  capture an optical image of a scene corresponding to the radar image; and
  write data representative of the optical image into the random access memory of the radar as part of the input to the artificial neural network;
wherein the circuit is configured to write the data representative of the radar image into the random access memory of the radar as part of the input to the artificial neural network in parallel with the image sensor writing of the data representative of the optical image into the random access memory; and
wherein the radar is configured to:
  store the input in the random access memory of the radar for a predetermined period of time after transmission of the data representative of the representative of attributes the host system;
  receive, within the predetermined period of time, a request from the host system;
  transmit the input to the host system; and
  erase the input from the radar after the predetermined period of time.

12. The device of claim 11, wherein the artificial neural network is configured to identify a classification of an feature, a portion extracted from the radar image showing the feature, or an orientation of an item represented by the feature, or any combination therein.

13. The device of claim 12, further comprising:
  a first connection between the random access memory and the image sensor; and
  a second connection between the random access memory and the circuit configured to generate the data representative of the radar image.

14. The device of claim 13, further comprising:
  a third connection between the random access memory and the field-programmable gate array (FPGA) or application specific integrated circuit (ASIC).

* * * * *